United States Patent
Hosey et al.

(10) Patent No.: US 10,339,738 B2
(45) Date of Patent: Jul. 2, 2019

(54) SYSTEMS AND METHODS OF ACCESS CONTROL IN SECURITY SYSTEMS WITH AUGMENTED REALITY

(71) Applicant: Honeywell International Inc., Morristown, NJ (US)

(72) Inventors: Mark Hosey, East Kilbride (GB); Paul D'Agostino, Ayrshire (GB); Kenneth Osborne, Glasgow (GB)

(73) Assignee: ADEMCO INC., Golden Valley, MN (US)

( * ) Notice: Subject to any disclaimer, the term of this patent is extended or adjusted under 35 U.S.C. 154(b) by 0 days.

(21) Appl. No.: 15/044,818

(22) Filed: Feb. 16, 2016

(65) Prior Publication Data

US 2017/0236348 A1    Aug. 17, 2017

(51) Int. Cl.
| | |
|---|---|
| *G07C 9/00* | (2006.01) |
| *G06T 19/00* | (2011.01) |
| *G06K 9/00* | (2006.01) |
| *H04W 12/08* | (2009.01) |
| *G06T 11/00* | (2006.01) |

(52) U.S. Cl.
CPC ..... *G07C 9/00158* (2013.01); *G06K 9/00671* (2013.01); *G06T 11/00* (2013.01); *G06T 19/006* (2013.01); *G07C 9/00134* (2013.01); *H04W 12/08* (2013.01); *G07C 9/00031* (2013.01)

(58) Field of Classification Search
None
See application file for complete search history.

(56) References Cited

U.S. PATENT DOCUMENTS

| | | | | |
|---|---|---|---|---|
| 7,248,151 B2* | 7/2007 | McCall | ............... | B60R 25/2045 340/425.5 |
| 8,430,310 B1* | 4/2013 | Ho | ............ | G06F 21/35 235/382 |
| 8,502,835 B1* | 8/2013 | Meehan | .............. | G06T 19/006 345/633 |
| 8,965,460 B1* | 2/2015 | Rao | .......... | G06F 3/005 455/566 |
| 2007/0273474 A1 | 11/2007 | Levine | | |
| 2008/0133930 A1* | 6/2008 | Moshir | .................. | G06F 21/35 713/183 |
| 2009/0289956 A1* | 11/2009 | Douris | ................... | H04W 4/21 345/633 |
| 2010/0060790 A1* | 3/2010 | Lee | .................... | H04N 5/44513 348/563 |

(Continued)

FOREIGN PATENT DOCUMENTS

WO    WO 2015085434 A1 *  6/2015  ............. G02B 27/01

OTHER PUBLICATIONS

Extended European search report from corresponding EP patent application 17152542.1, dated Jun. 7, 2017.

*Primary Examiner* — Kee M Tung
*Assistant Examiner* — Patrick F Valdez
(74) *Attorney, Agent, or Firm* — Husch Blackwell LLP

(57) ABSTRACT

Systems and methods of access control in security systems with augmented reality are provided. Some methods can include receiving an image of an exterior of a secured area, displaying the received image on a display device, identifying at least one artifact associated with the received image, and superimposing at least one computer generated image of the identified artifact on the displayed image, thereby augmenting the displayed image.

16 Claims, 2 Drawing Sheets

(56) References Cited

U.S. PATENT DOCUMENTS

| | | | |
|---|---|---|---|
| 2011/0061100 A1 | 3/2011 | Mattila et al. | |
| 2011/0105220 A1* | 5/2011 | Hill | H04L 63/08 |
| | | | 463/29 |
| 2012/0290591 A1* | 11/2012 | Flynn | G06F 17/30247 |
| | | | 707/754 |
| 2013/0221094 A1* | 8/2013 | Smith | G07C 9/00309 |
| | | | 235/382 |
| 2014/0125574 A1 | 5/2014 | Scavezze et al. | |
| 2014/0196119 A1* | 7/2014 | Hill | G06F 21/32 |
| | | | 726/4 |
| 2014/0253285 A1* | 9/2014 | Menzel | G07C 9/00023 |
| | | | 340/5.7 |
| 2015/0154598 A1 | 6/2015 | Forte et al. | |
| 2015/0221151 A1* | 8/2015 | Bacco | G07C 9/00158 |
| | | | 340/5.83 |
| 2015/0310685 A1* | 10/2015 | Bliding | G07C 9/00103 |
| | | | 340/5.61 |
| 2016/0035246 A1* | 2/2016 | Curtis | H04L 67/10 |
| | | | 434/219 |
| 2017/0076415 A1* | 3/2017 | Ng-Thow-Hing | G06F 3/017 |
| 2017/0199994 A1* | 7/2017 | Shalev | G06F 21/316 |

\* cited by examiner

SYSTEMS AND METHODS OF ACCESS CONTROL IN SECURITY SYSTEMS WITH AUGMENTED REALITY

FIELD

The present invention relates generally to access control in security systems. More particularly, the present invention relates to systems and methods of access control in security systems with augmented reality.

BACKGROUND

Protected premises and secured areas often require the servicing, maintenance, or installation of on-site equipment or machinery, the delivery or dispatch of materials or equipment, or the performance of other service tasks by authorized personnel, while, as the same time, excluding unauthorized personnel from the protected premises or secured area. To implement such security measures, some protected premises or secured areas require the attendance of security personnel to check security credentials of the service personnel. However, security personnel can be expensive.

Accordingly, some protected premises or secured areas include automated access control systems that allow security personnel to gain entry using keypads, card readers, or other access control devices in communication with electronically controlled locks, latches, doors, or actuators. While access control equipment attached to the exterior of a protected premise or secured area can be inexpensive, such equipment can be the focus of vandalism or illicit attempts by unauthorized persons to gain access to the protected premise or secured area, or, simply, can be unappealing aesthetically. For example, automated access control equipment can render an access control system vulnerable to attack by system interference, such as attempts to disable an alarm or access control system by interfering with an associated signal or power cable.

In view of the above, there is a continuing, ongoing need for improved systems and methods of access control in security systems.

DETAILED DESCRIPTION

Figure 1:
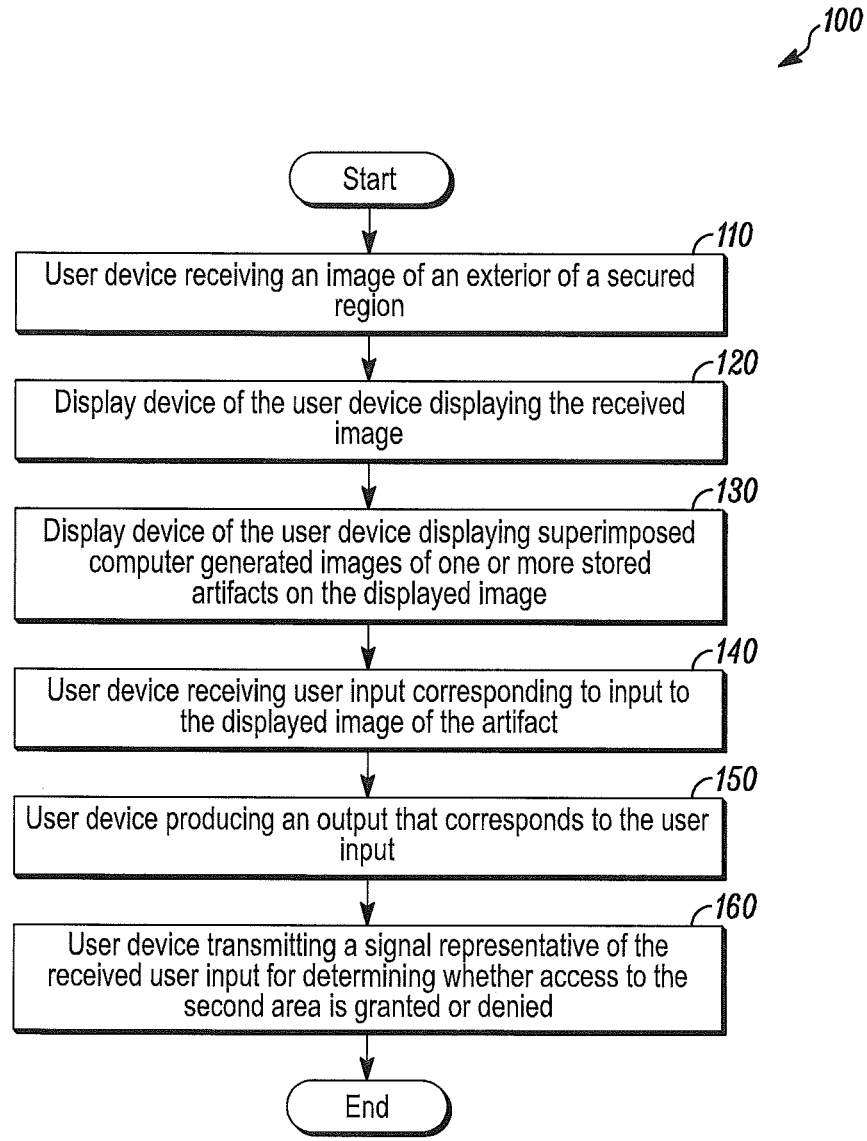
FIG. 1 is a flow diagram of a method in accordance with disclosed embodiments.

While this invention is susceptible of an embodiment in many different forms, there are shown in the drawings and will be described herein in detail specific embodiments thereof with the understanding that the present disclosure is to be considered as an exemplification of the principles of the invention. It is not intended to limit the invention to the specific illustrated embodiments.

Embodiments disclosed herein can include systems and methods of access control in security systems with augmented reality. For example, in accordance with disclosed embodiments, access control hardware devices, such as fixed electronic access control devices at entry and exit points of a protected premise or secured area, can be eliminated from the periphery or exterior of the premise or area. Instead, a user interface of an authorized device carried by authorized personnel can display one or more augmented reality artifacts associated with an access control or security system that can be used to provide access to the authorized personnel to a locked or otherwise secured location.

When hardware devices are eliminated from the periphery or exterior of protected premises or secured areas as disclosed herein, so too are removed the possibility of vandalism of such hardware devices and the possibility of tampering or interference with such security systems by unauthorized personnel interfering with such hardware devices or cabling thereto. Indeed, when hardware devices are eliminated from the periphery or exterior of protected premises or secured areas as disclosed herein, many security features and levels or layers of security can be implemented that could not otherwise be provided with known systems and methods. Furthermore, when hardware devices are eliminated from the periphery or exterior of protected premises or secured areas as disclosed herein, the aesthetic look of the exterior can be improved, which can be especially desirable for systems that protect buildings of historical or architectural importance.

In some embodiments, systems and methods disclosed herein can grant access to a protected premise or secured area to an authorized device or authorized personnel on a one-time basis or on a multi-time basis. For example, delivery personnel can be granted a one-time access to the protected premise or secured area within a predetermined period of time to make a delivery or to pick up a package. Conversely, maintenance or construction personnel can be granted access multiple times over a prolonged period of time to maintain or service the protected premise or secured area, and in some embodiments, predetermined periods of time within the prolonged period of time can be defined for granting such access.

In an exemplary embodiment, a display device of an authorized device, such as a mobile telephone or tablet, can display an image of the exterior of a protected premise or secured area that is received from a camera capturing said exterior. For example, the protected premise or secured area can include, but is not limited to, a property to which access is sought, a safe or secure container, such as a mail box or bank vault secure box to which access is sought, or a security system to which access is sought. Systems and methods disclosed herein can superimpose or otherwise display computer generated images of stored artifacts on the displayed image to augment the displayed and observed exterior of the premise or area. In some embodiments, the image of the artifact can be displayed in any position, height, orientation, or volume of the displayed exterior of the premise or area as would be desired by a user of the device.

In some embodiments, an artifact as disclosed herein can include, but is not limited to, an object, device, icon, sound, haptic stimuli, such as vibration, or other sensory stimulating artifact that can be reproduced and sensed through or from a display device. In some embodiments, an object artifact can include a keypad, symbolic puzzle or pattern, card reader, lock, combination lock, key card, key, keyhole, padlock, button array, or any other representation of access control hardware as would be known and desired by one of skill in the art. For example, in some embodiments, when an artifact includes a keypad, systems and methods disclosed herein can display an image of the keypad on a predetermined location of the displayed image.

Systems and methods disclosed herein can facilitate a user interacting with the displayed artifacts and can respond to user input accordingly. For example, in some embodiments, a user can provide input to the display device that corresponds to depressing a button on the displayed keypad. In some embodiments, the displayed keypad can respond in a manner as would be expected from traditional keypad hardware. For example, the display device or the authorized device can produce a sound, beep, or vibration responsive to each user input that corresponds to a key press.

It is to be understood that an authorized device as disclosed herein can include a device that includes an imaging device that can image an ambient location in real time, that includes a display device that can display images captured by the imaging device in real time, that can recognize images, that can display and maintain the position of computer generated images of stored artifacts that can augment a displayed image, that can communicate via telecommunication or radio networks, such as 4G, WiFi, or Bluetooth, or that can determine position and orientation of the device. For example, an authorized device as disclosed herein can include, but is not limited to, a proprietary electronic handheld user interface device, a mobile phone, a fixed device at a location, or a camera with an interactive touch screen.

Security can be maintained with the following features, which can be implemented by the systems and methods disclosed herein, alone or in combination: (1) computer generated images of stored artifacts can be displayed only on an authorized device that has a unique or one time pass code stored thereon that was supplied by an authorizing body or person; (2) computer generated images of stored artifacts can be displayed on an authorized device only to an authorized person who can access the display device of the authorized device using a unique or one time password or other controlled security scheme; (3) computer generated images of stored artifacts can be displayed only on an authorized device that is within a predetermined distance of a protected premise or secured area to which access is being sought, (4) computer generated images of stored artifacts can be displayed on an authorized device only within predetermined time periods; and (5) computer generated images of stored artifacts can be displayed on an authorized device only when a corresponding imaging device or camera is capturing a predetermined portion of the protected premises or secured area, for example, the portion of the premises or area on which the image of the artifact will be displayed on an image of the premises or area. In some embodiments, the authorizing body or person can provide information to a user of the authorized device as to the predetermined portion of the premises or area that must be captured by the imaging device. Accordingly, in some embodiments, only authorized persons using the authorized display device, with the appropriate codes and passwords, and with knowledge of the location of access control artifacts and authorized times for accessing a protected premises or secured location, can use the systems and methods disclosed herein to gain access to the premises or location.

FIG. 1 is a flow diagram of a method 100 in accordance with disclosed embodiments. As seen in FIG. 1, the method 100 can include a user device receiving an image of an exterior of a secured area as in 110. For example, in some embodiments, an imaging device of the user device can obtain the image, and in some embodiments, the user device can obtain the image from a remote imaging device. In either embodiment, the user device can arrive at the location of the secured area prior to receiving the image, and in some embodiments, a user can log into the user device for authentication of the location of the user device and the user device itself prior to receiving the image.

The method 100 can also include a display device of the user device displaying the received image as in 120 and displaying superimposed computer generated images of one or more stored artifacts on the displayed image as in 130. For example, in some embodiments, the user device can identify its location and recognize the received and displayed image, and responsive thereto, can access a database device to identify the one or more stored artifacts as being associated therewith. In some embodiments, the method 100 can display the images of the artifacts as in 130 only after the user device has received an appropriate password or pass code. In some embodiments, the method 100 can display the images of the artifact as in 130 only when the user device is within a predetermined distance of the remote imaging device or the secured area. In some embodiments, the method 100 can display the images of the artifact as in 130 only within predetermined time periods. In some embodiments, the method 100 can display the images of the artifacts as in 130 only when the received image includes the portion of the exterior of the secured area onto which the image of the artifact is to be displayed.

As seen in FIG. 1, after displaying the images of the artifacts as in 130, the method 100 can include a user interacting with the displayed artifact, for example, by the user device receiving user input corresponding to input to the displayed image of the artifact as in 140 and the user device producing an output that corresponds to the input at in 150. Furthermore, the method 100 can include the user device transmitting a signal representative of the received user input for determining whether access to the secured area is granted or denied as in 160.

The method 100 of FIG. 1 and others in accordance with disclosed embodiments can be executed, for example, by a user device, by a user device and a control panel of a security system, by a user device and a remote monitoring station, or by a user device, a control panel of a security system, and a remote monitoring station. For example, FIG. 2 is a block diagram of a system 200 in accordance with disclosed embodiments.

Figure 2:
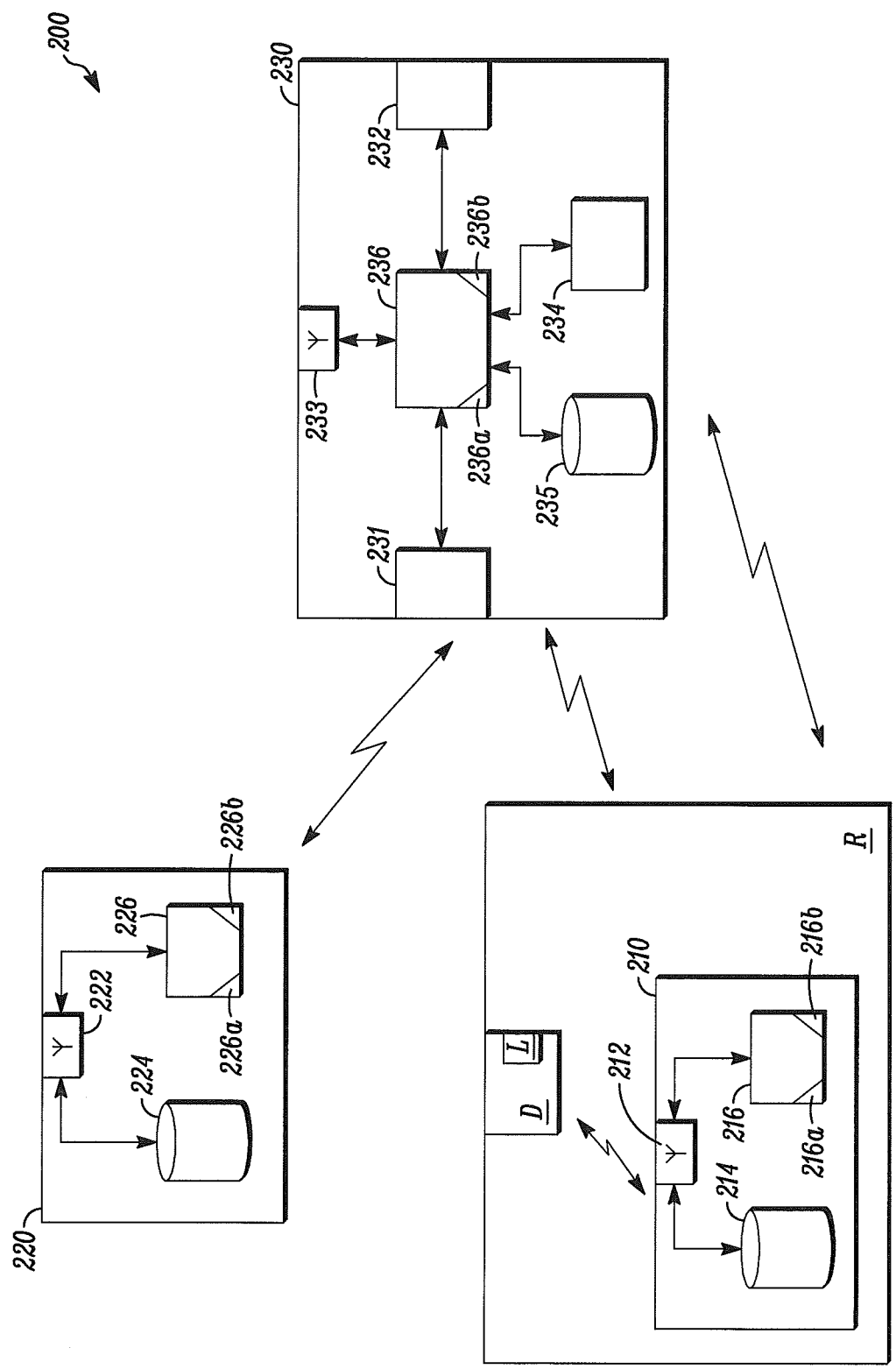
FIG. 2 is a block diagram of a system in accordance with disclosed embodiments.

As seen in FIG. 2, the system 200 can include a region R secured by an electronically controlled lock L, latch or other actuator of a door D. A control panel 210 of a security system monitoring the region R can be located within the region R and can be in communication with a remote monitoring station 220. The system 200 can also include a user device 230 that can communicate with one or more of the lock L, the door D, the control panel 210, and the remote monitoring station 220.

In some embodiments, the user device 230 can include an observation or imaging device 231, for example, a camera, a display device 232, for example, a screen, a transceiver 233, for example, an antenna, a GPS device 234, and a database device 235, each of which can be in communication with control circuitry 236, one or more programmable processors 236a, and executable control software 236b as would be understood by one of ordinary skill in the art. Similarly, in some embodiments, the control panel 210 can include a transceiver 212 and a database device 214, each of which can be in communication with control circuitry 216, one or more programmable processors 216a, and executable control software 216b as would be understood by one of ordinary skill in the art, and the remote monitoring station 220 can include a transceiver 222 and a database device 224, each of which can be in communication with control circuitry 226, one or more programmable processors 226a, and executable control software 226b as would be understood by one of ordinary skill in the art. Each of the executable control software 236b, 216, 226b can be stored on a transitory or non-transitory computer readable medium, including, but not limited to, local computer memory, RAM, optical storage media, magnetic storage media, flash memory, and the like. In some embodiments, some or all of the control circuitry 236, 216, 226, programmable processors 236a, 216a, 226a, and control software 236b, 216b, 226b can execute and control the methods described above and herein.

For example, the user device 230 can receive an image of the exterior of the region R from the imaging device 231 or from a remote imaging device, and the display device 232 can display the received image. The control circuitry 236, programmable processor 236a, and control software 236b can receive a signal from the GPS device 234 to determine a location of the device 230 and can access the database device 235 or communicate with the control panel 210 or the remote monitoring station 220, via the transceiver 233, to recognize the received and displayed image, based at least in part on the determined location, and to identify one or more artifacts stored in one or more of the database devices 235, 215, 225 and associated therewith. For example, one or more of the database devices 235, 215, 225 can include a library of stored artifacts, and in some embodiments, each of the stored artifacts can be cross-referenced with a location and/or a recognized image. The display device 232 can display computer generated images of the identified artifacts superimposed on the displayed image of the exterior of the region R. Finally, the user device 230 can receive user input, for example, via the display device 232, corresponding to input to the displayed image of the artifact, and the control circuitry 236, programmable processor 236a, and control software 236b can transmit a signal responsive to the received input. For example, when the received input corresponds to an authorized action to access the secured region R, the control circuitry 236, programmable processor 236a, and control software 236b can transmit a signal, via the transceiver 233, either directly to the lock L on the door D, or via the control panel 210, to unlock the door D. However, when the received input corresponds to an unauthorized action to access the secured region R, the control circuitry 236, programmable processor 236a, and control software 236b can refrain from transmitting any such unlocking signal. In some embodiments, the control circuitry 236, programmable processor 236a, and control software 236b can transmit a signal to confirm completion of the operation attempted on the secured area, for example, via GPS, password transmission, or a local or remote data exchange.

In some embodiments, the control circuitry 236, programmable processor 236a, and control software 236b can implement and execute some or all of the security features disclosed above and herein. For example, in some embodiments, service personnel can obtain, either in person, online, or via secure email or local or remote data exchange, access control privileges that can include passwords or pass codes that can be entered into or stored on the user device 230 and that can be valid for a predetermined period of time and within a predetermined distance of a secured region.

Although a few embodiments have been described in detail above, other modifications are possible. For example, the logic flows described above do not require the particular order described, or sequential order, to achieve desirable results. Other steps may be provided, or steps may be eliminated, from the described flows, and other components may be added to, or removed from, the described systems. Other embodiments may be within the scope of the invention.

From the foregoing, it will be observed that numerous variations and modifications may be effected without departing from the spirit and scope of the invention. It is to be understood that no limitation with respect to the specific system or method described herein is intended or should be inferred. It is, of course, intended to cover all such modifications as fall within the spirit and scope of the invention.

What is claimed is:

1. A method comprising:
   an imaging device capturing a static image of an exterior of a secured area;
   a user device receiving the static image from the imaging device;
   the user device displaying the static image on a display of the user device;
   the user device determining whether the static image includes a predetermined portion of the exterior of the secured area, the predetermined portion of the exterior of the secured area corresponding to a location within the static image where at least one computer generated image of at least one artifact associated with the static image is to be displayed;
   when the static image includes the predetermined portion of the exterior of the secured area, the user device identifying the at least one artifact associated with the static image from a database of the user device;
   the user device identifying a current distance of the user device from the secured area;
   the user device retrieving a predetermined distance from the database of the user device;
   the user device determining whether the current distance of the user device from the secured area is less than or equal to the predetermined distance by comparing the current distance to the predetermined distance; and
   responsive to the current distance of the user device from the secured area being less than or equal to the predetermined distance and the static image including the predetermined portion of the exterior of the secured area, the user device superimposing the at least one computer generated image of the at least one artifact at the location within the static image as displayed on the display of the user device.

2. The method of claim 1 further comprising:
   the user device receiving user input interacting with the at least one computer generated image of the at least one artifact; and
   the user device producing a local output responsive to the user input.

3. The method of claim 1 further comprising:
   the user device receiving user input interacting with the at least one computer generated image of the at least one artifact; and
   the user device transmitting a signal representative of the user input to a control panel for determining whether access to the secured area is authorized.

4. The method of claim 1 further comprising:
   the user device receiving user input interacting with the at least one computer generated image of the at least one artifact; and
   the user device determining whether the user input corresponds to an authorized action to access the secured area and, responsive thereto, transmitting a signal to grant the access to the secured area.

5. The method of claim 1 wherein identifying the at least one artifact associated with the static image and superimposing the at least one computer generated image of the at least one artifact at the location within the static image as displayed on the display of the user device are responsive to identifying an authorized password received by the user device.

6. The method of claim 1 further comprising identifying the current distance of the user device from the secured area by identifying a GPS location of the user device.

7. The method of claim 6 further comprising identifying the at least one artifact as being associated with the GPS location of the user device.

8. The method of claim 1 wherein identifying the at least one artifact associated with the static image and superimposing the at least one computer generated image of the at least one artifact at the location within the static image as displayed on the display of the user device are responsive to determining whether a current time is within an authorized predetermined period of time.

9. A user device comprising:
an imaging device;
a database device;
a display device; and
a programmable processor,
wherein the imaging device captures a static image of an exterior of a secured area,
wherein the display device displays the static image,
wherein the programmable processor determines whether the static image includes a predetermined portion of the exterior of the secured area,
wherein the predetermined portion of the exterior of the secured area corresponds to a location within the static image where at least one computer generated image of at least one artifact associated with the static image is to be displayed,
wherein, when the static image includes the predetermined portion of the exterior of the secured area, the programmable processor identifies the at least one artifact associated with the static image from the database device,
wherein the programmable processor identifies a current distance of the user device from the secured area, retrieves a predetermined distance from the database of the user device, and determines whether the current distance of the user device from the secured area is less than or equal to the predetermined distance by comparing the current distance to the predetermined distance, and
wherein, responsive to the current distance of the user device from the secured area being less than or equal to the predetermined distance and the static image including the predetermined portion of the exterior of the secured area, the programmable processor superimposes the at least one computer generated image of the at least one artifact at the location within the static image as displayed on the display device.

10. The user device of claim 9 wherein the display device receives user input interacting with the at least one computer generated image of the at least one artifact, and wherein the programmable processor transmits a signal to produce a local output responsive to the user input.

11. The user device of claim 9 further comprising:
a transceiver,
wherein the display device receives user input interacting with the at least one computer generated image of the at least one artifact, and
wherein the programmable processor transmits, via the transceiver, a signal representative of the user input for determining whether access to the secured area is authorized.

12. The user device of claim 9 further comprising:
a transceiver,
wherein the display device receives user input interacting with the at least one computer generated image of the at least one artifact, and
wherein the programmable processor determines whether the user input corresponds to an authorized action to access the secured area and, responsive thereto, transmits a signal, via the transceiver, to grant the access to the secured area.

13. The user device of claim 9 wherein the programmable processor identifies the at least one artifact associated with the static image and superimposes the at least one computer generated image of the at least one artifact at the location within the static image as displayed on the display device responsive to the programmable processor identifying an authorized password received by the display device.

14. The user device of claim 9 further comprising:
a GPS device,
wherein the GPS device identifies a first GPS location of the user device,
wherein the programmable processor identifies a second GPS location of the secured area stored in the database device, and
wherein the programmable processor uses the first GPS location of the user device and the second GPS location of the secured area to determine the current distance of the user device from the secured area.

15. The user device of claim 9 further comprising:
a GPS device,
wherein the GPS device identifies a GPS location of the user device,
wherein the programmable processor uses the GPS location of the user device to determine the current distance of the user device from the secured area, and
wherein the programmable processor identifies the at least one artifact as being associated with the GPS location of the user device.

16. The user device of claim 9 wherein the programmable processor identifies the at least one artifact associated with the static image and superimposes the at least one computer generated image of the at least one artifact at the location within the static image as displayed on the display device responsive to the programmable processor determining whether a current time is within an authorized predetermined period of time.

* * * * *